United States Patent [19]

O'Brien, Jr.

[11] 4,114,555

[45] Sep. 19, 1978

[54] APPARATUS FOR AND METHOD OF INTERCONNECTING AND CONTROLLING UNITS OF A POWER TRAIN FOR MAXIMUM FLEXIBILITY AND ECONOMY IN OPERATING AUXILLIARY MARINE VESSELS

[76] Inventor: Harry W. O'Brien, Jr., 203 Carondelet St., New Orleans, La. 70130

[21] Appl. No.: 777,184

[22] Filed: Mar. 14, 1977

[51] Int. Cl.² .......................................... B63H 21/12
[52] U.S. Cl. ...................................... 115/76; 114/121;
  115/900; 318/148; 318/338; 318/493
[58] Field of Search .................. 114/121, 269; 115/76,
  115/900; 290/39, 40 C; 318/338, 79, 493, 148,
  151

[56] References Cited

U.S. PATENT DOCUMENTS

| 1,861,750 | 6/1932 | Mitzlaff | 318/148 |
| 3,148,318 | 9/1964 | Bradburn, Jr. et al. | 318/338 X |
| 3,351,830 | 11/1967 | Samson et al. | 318/493 X |

FOREIGN PATENT DOCUMENTS

| 941,222 | 1/1949 | France | 318/338 |
| 2,316,423 | 10/1974 | Fed. Rep. of Germany | 115/76 |

Primary Examiner—Trygve M. Blix
Assistant Examiner—Sherman D. Basinger
Attorney, Agent, or Firm—James B. Lake, Jr.

[57] ABSTRACT

A plurality of diesel motor AC generator units, or power producing units, connected in parallel to provide a AC power pool that is rectified and voltage controlled by a plurality of silicon control rectifiers, or power control units, for activating any of a plurality of DC shunt wound motors, or power using units, singly and in combination to drive any plurality of propellers and auxilliary equipment in minimum numbers at maximum loads and effect a fuel economy of at least 18% over reduction-gear driven vessels.

5 Claims, 7 Drawing Figures

APPARATUS FOR AND METHOD OF INTERCONNECTING AND CONTROLLING UNITS OF A POWER TRAIN FOR MAXIMUM FLEXIBILITY AND ECONOMY IN OPERATING AUXILLIARY MARINE VESSELS

BACKGROUND OF THE INVENTION

The invention relates generally to power trains for powering auxiliary marine vessels, and more particularly to diesel electric power trains having silicon voltage control rectifiers for vessels subject to a wide range of loads, uses and space limitations.

In the prior art power trains for the purposes noted lacked flexibility of operation and control, and within such limitations often operated at less than maximum efficiency.

SUMMARY OF THE INVENTION

It is an object of the invention to provide a power train for auxiliary marine vessels that is controllable by a plurality of power control units in forward and reverse directions from zero to maximum r.p.m. (revolutions per minute).

Another object of the invention is to provide a power train as stated above comprising a plurality of power producing and power using units that have respectively different performance characteristics that are synergistically complementary to supply a variety of loads at respectively maximum unit efficiency.

Yet another object of the invention is to supply a standby for each power producing, using and control unit to prevent a failure of one from interfering with the flexibility and control for the full efficient use of said power train.

A further object of the invention is to provide a power train that is susceptable to division for an installation of maximum convenience and space saving.

A final object of the invention is to provide a method of synergistically complementing the maximum advantages of power producing and power using units and eliminating the respective disadvantages of both.

DETAILED DESCRIPTION OF THE INVENTION

Figure 1:
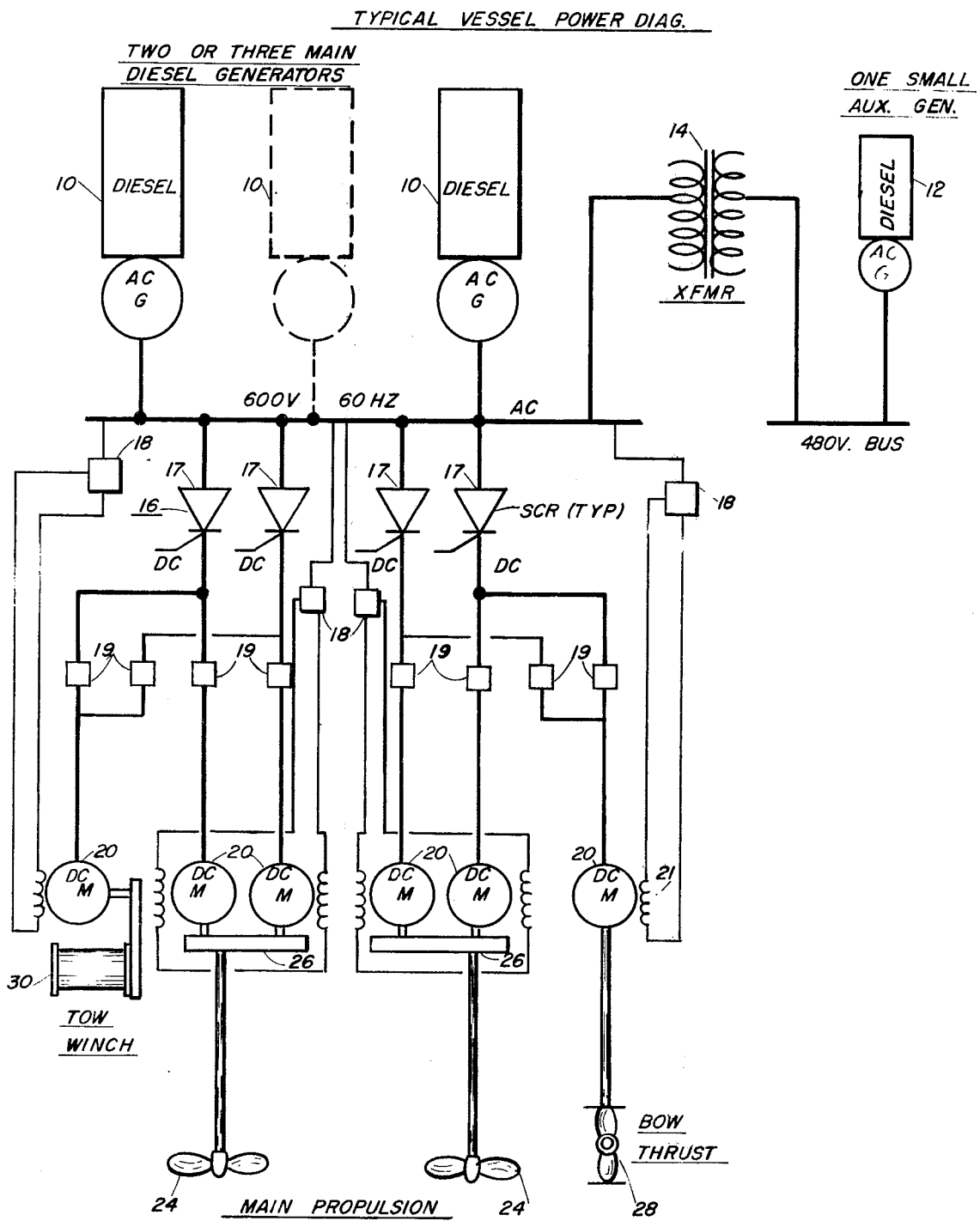
FIG. 1 is a schematic diagram of a typical power train according to the invention.

Referring to FIG. 1, a typical power train 9 of the invention comprises two main diesel motor AC generator units, or power producing units 10, connected in parallel and to a smaller auxiliary diesel motor AC generator, or power producing unit 12, through a transformer 14. A third diesel motor AC generator, or power producing unit 10′, shown in phantom may be added to the power train if desired.

The output of power producing units 10 is rectified and voltage controlled by power control units 16 comprising four silicon control rectifiers 17 and four variable current controls 18. The silicon control rectifiers 17 are connected through magnetic contacts 19 to shunt wound DC motors, or power using units 20. Current through the shunt field windings 21 is regulated by said current controls 18 mounted between the output of said power producing units 10 and said field windings or coil 21. Main propulsion motors 20 respectively receive the output of a power control unit 16, the propulsion motors being mounted in pairs to drive respective main propellers and propeller shafts 24 either singly or jointly through respectively common gear boxes 26. Single motors 20 are provided to drive main auxiliaries such as a bow thruster 28 and a tow winch 30 respectively. These motors are connected each alternatively to a pair of silicon control rectifiers 17 and each to a variable current control 18 to provide standbys in case of a failure of one.

Figure 2:
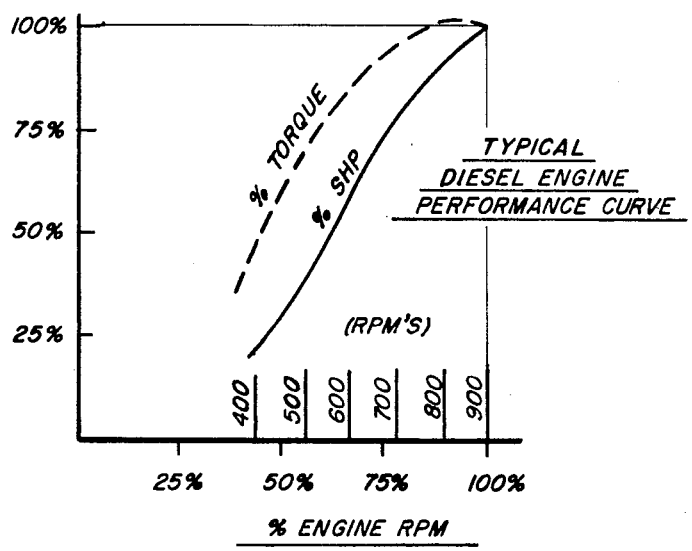
FIG. 2 is a graph of a typical diesel engine performance curve.

Referring to FIG. 2, the performance characteristics of a diesel engine is shown to be that torque and horsepower rises with rpm until a maximum for all three is reached. Since the diesel of the disclosure cannot safely be run above 900 rpm, the torque and horsepower at this speed is maximum at 100%.

Figure 3:
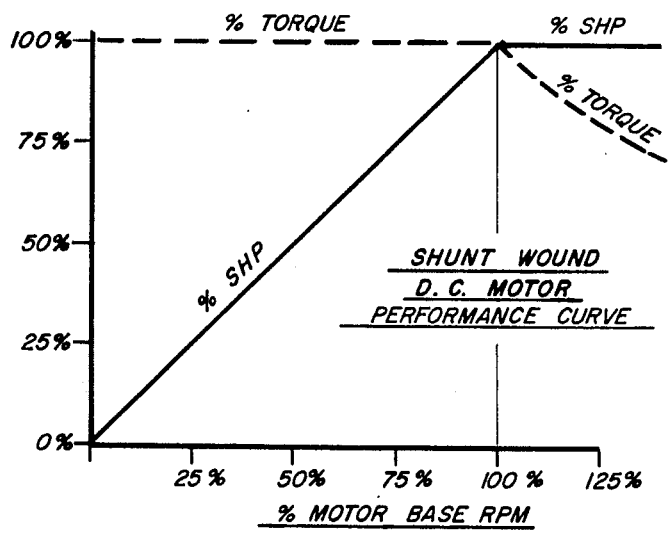
FIG. 3 is a graph of the performance curve of a shunt wound DC motor.

Referring to FIG. 3, the performance characteristics of a shunt wound DC motor is shown to be that torque is constant at 100% from zero through 100% of the base revolutions/minute, the horsepower rising with the rpms to maximum at 100% of the base rpms as voltage to the motor is increased. Thereafter rpms can be increased up to 200% of the base rpms without damage by reducing shunt field current. In this mode horsepower remains constant at 100% and the torque varies downward as shown in FIG. 3.

Figure 4:
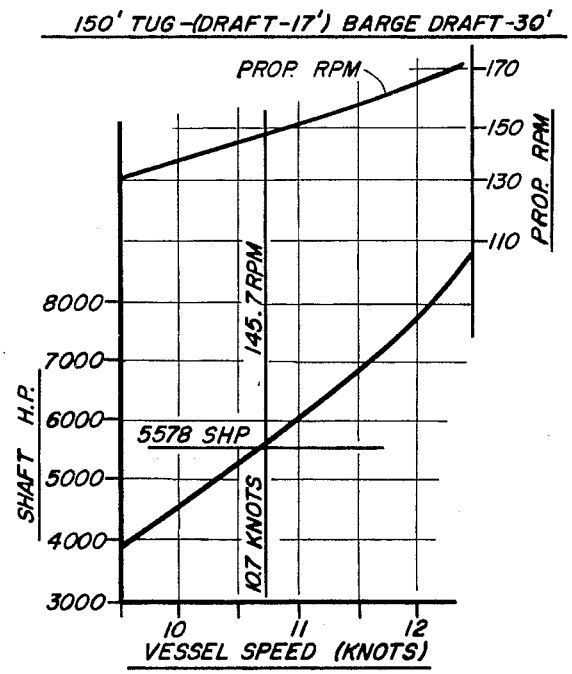
FIG. 4 is a graph of the propellor r.p.m. curve and vessel speed curve for a towing tug having a conventional reduction gear drive.

Referring now to FIG. 4, a tug and tow performance curve shows that with 5578 shaft horsepower, the tug and tow will make 10.7 knots with propellor speed of 145.7 rpms. Now referring to FIG. 5, it is seen that when running free, the tug of FIG. 4 is limited by its gear reduction drive to a propeller speed of 150 rpm to use only 3330 shaft horsepower of the 5578 shaft horsepower available to make 14.63 knots. It is seen in comparison, that the electric drive of the invention with one engine of 2600 shaft horsepower can drive the tug 13.9 knots with both propellers at a speed of 140 rpm using all available shaft horsepower, which is only 0.73 knots less than the reduction gear drive does with two engines. If two engines are used in the electric drive of the invention which can increase its motor, shaft and propeller speeds without damage by reducing the motor field current, it is seen that at 168 rpm all available 5200 shaft horsepower is used to drive the tug 15.7 knots.

Figure 5:
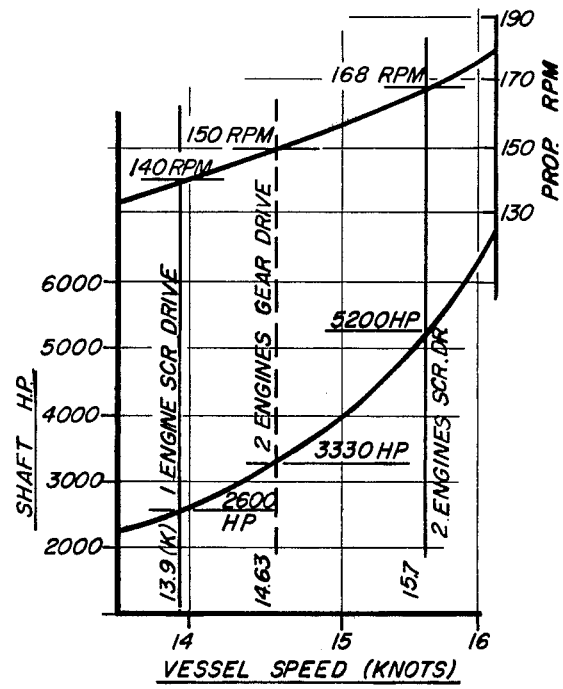
FIG. 5 is a graph similar to FIG. 4 but with the tug free running with no tow, and with invention drive data comparably entered.
Figure 6:
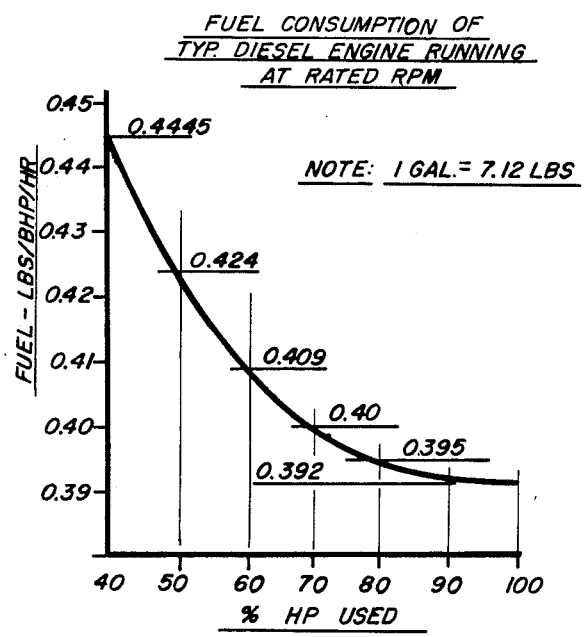
FIG. 6 is a graph showing fuel consumption of a typical diesel engine running at rated r.p.m.

Referring now to FIG. 6, the fuel consumption curve of a diesel engine shows that fuel consumption per brake horsepower/hour decreases as the load increases to its rated capacity. Thus in the case of FIG. 5 for the gear reduction drive tug only 3400 brake horsepower of the 5750 available is used, that is about 60% for a fuel consumption rate of 0.409 lbs/bph/hr. or 197.2 gallons/hr. Whereas the invention using one engine utilizes the full 2875 brake horsepower available to consume only 0.392 lb/bhp/hr. or 158.3 gallons/hr. In free running, the electric drive of the invention will use 734 gals. per day less to travel the same distance, that is, less about 18%. Even if the power train of the invention has about 10% loss against 3% loss in the gear reduction drive power train, or a net of 7% loss, nevertheless there is a fuel economy gain of 18%, plus half the lubricating oil and half the engine time expended for 8% slower time for the trip.

Figure 7:
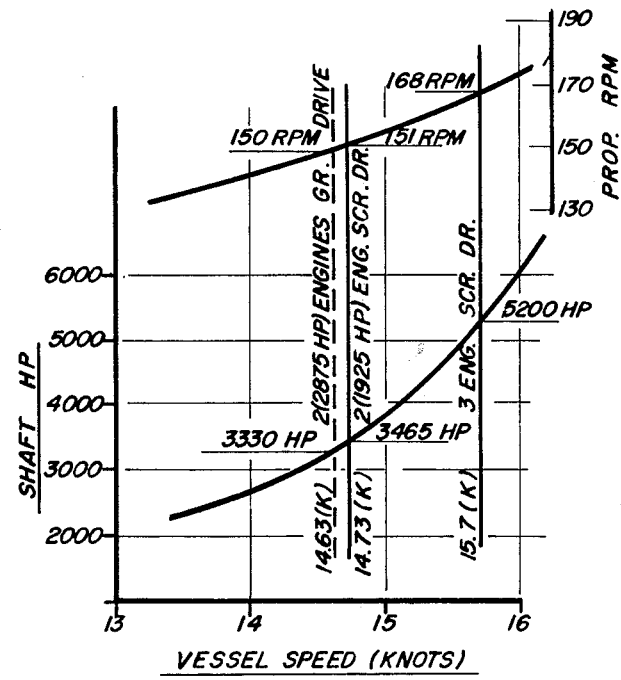
FIG. 7 is a graph similar to FIG. 5 comparing a two diesel reduction gear drive with two and three diesel electric drive according to the invention.

Referring to FIG. 7, a further comparison is made as in FIG. 5 but with diesel engines of lesser brake horsepower in two and three engine installations.

In addition to economy of operation the power train of the invention lends itself to a further economy in the use of limited space available on an auxiliary marine vessel. Thus power producing units may be mounted forward to better trim the vessel without an addition of ballast when loaded or working, and the power using units may be mounted aft to shorten propeller shafts and save the space required by longer ones. Power control units may be mounted wherever convenient, their mass and space being negligible.

It should be understood, that the invention units can be separately and jointly connected in any arrangement in number and function so that power using units can be run independently of each other off of one producing unit through one or more power control units, or vice versa.

What is claimed is:

1. Apparatus for interconnecting and controlling units of a power train for maximum flexibility and economy in the operation of auxiliary marine vessels having propellers and propeller shafts driven thereby, and comprising in combination:
    a. a plurality of power producing unit means connected in parallel, and each comprisng electrical generating means for producing a constant voltage and frequency AC, and diesel engine means for producing maximum torque and brake horsepower at maximum rated rpms and minimum fuel consumption per brake horsepower hour for driving said electrical generating means;
    b. a plurality of power control unit means connected in parallel with each other and respectively in series with said power producing unit means and comprising a plurality of silicon control rectifier means for rectifying and voltage controlling a constant voltage and frequency AC output of said electrical generating means into variable voltage DC, and a plurality of electrical current control means connected in parallel with each other and in series with said electrical generating means for rectifying and varying the current; and
    c. a plurality of power using unit means comprising a plurality of shunt wound DC motor means having rotor coils and field coils, said rotor coils for connecting together in parallel, and to the silicon control rectifier means in series combination with said power producing unit means for activation and control of varying speeds of said DC motor means below 100% and less of base rpms thereof, said field coils being connected in series through said electrical current control means with said electrical generating means and in parallel with each other for activating said DC motor means in combination with said silicon control rectifier means and controlling said varying speeds above said 100% of base rpms of said DC motor means.

2. Apparatus as described in claim 1 wherein a pair of said plurality of DC motor means are mounted to jointly and severally drive each of said propellers and propeller shafts through a common gear box, the shunt wound field coils of said pair of DC motor means being connected in series to current controled DC, and the rotor coils to voltage controlled DC.

3. Apparatus as described in claim 1 wherein at least one of said plurality of shunt wound DC motor means is for driving auxiliary equipment, and its rotor coil is connected alternatively to the silicon control rectifier means of a pair of said plurality of DC motor means, and its field coil is connected to an independent current control means.

4. Apparatus as described in claim 1 wherein said plurality of power producing unit means are mounted forwardly in said auxiliary marine vessel for substantially trimming said vessel when loaded and working without the use of ballast, and the loss of space therefor.

5. Apparatus as described in claim 1 wherein said plurality of power using unit means are mounted aft in said auxiliary marine vessel for minimizing the length of said propeller shafts and the space required for said shafts.

* * * * *